US007987484B2

(12) United States Patent
Sloo

(10) Patent No.: US 7,987,484 B2
(45) Date of Patent: Jul. 26, 2011

(54) MANAGING MEDIA CONTENT WITH A SELF-ORGANIZING MAP

(75) Inventor: David H. Sloo, Menlo Park, CA (US)

(73) Assignee: Microsoft Corporation, Redmond, WA (US)

( * ) Notice: Subject to any disclaimer, the term of this patent is extended or adjusted under 35 U.S.C. 154(b) by 704 days.

(21) Appl. No.: 11/821,747

(22) Filed: Jun. 24, 2007

(65) Prior Publication Data

US 2008/0320515 A1    Dec. 25, 2008

(51) Int. Cl.
*H04N 5/445* (2011.01)
*G06F 3/00* (2006.01)
*G06F 13/00* (2006.01)
*G06F 3/048* (2006.01)
*G06F 17/30* (2006.01)

(52) U.S. Cl. ........... 725/45; 725/38; 725/39; 725/43; 725/44; 725/46; 725/53; 715/766; 715/825; 715/848; 707/804

(58) Field of Classification Search ............. 725/45, 725/38, 39, 43, 44, 46, 53; 715/766, 825, 715/848; 707/804
See application file for complete search history.

(56) References Cited

U.S. PATENT DOCUMENTS

| 6,016,144 | A  | * | 1/2000 | Blonstein et al. ............. 715/791 |
| 6,516,337 | B1 |   | 2/2003 | Tripp et al. |
| 6,522,342 | B1 | * | 2/2003 | Gagnon et al. ............... 715/716 |
| 6,631,496 | B1 |   | 10/2003 | Li et al. |
| 6,735,578 | B2 |   | 5/2004 | Shetty et al. |
| 6,768,982 | B1 |   | 7/2004 | Collins et al. |
| 6,910,191 | B2 | * | 6/2005 | Segerberg et al. ........... 715/830 |
| 7,174,512 | B2 | * | 2/2007 | Martin et al. ................ 715/719 |
| 7,644,425 | B2 | * | 1/2010 | Parker et al. ................. 725/41 |
| 2003/0005439 | A1 | * | 1/2003 | Rovira ........................... 725/37 |
| 2003/0061212 | A1 | * | 3/2003 | Smith et al. ..................... 707/6 |
| 2004/0003403 | A1 | * | 1/2004 | Marsh ........................... 725/53 |
| 2005/0027712 | A1 |   | 2/2005 | Gargi et al. |
| 2005/0097120 | A1 |   | 5/2005 | Cooper et al. |
| 2005/0097603 | A1 | * | 5/2005 | Kikinis ......................... 725/44 |
| 2005/0154701 | A1 |   | 7/2005 | Parunak et al. |
| 2005/0216295 | A1 |   | 9/2005 | Abrahamsohn |
| 2005/0251383 | A1 |   | 11/2005 | Murray |
| 2006/0026203 | A1 |   | 2/2006 | Tan et al. |
| 2006/0230140 | A1 |   | 10/2006 | Aoyama et al. |
| 2007/0180470 | A1 | * | 8/2007 | Gill et al. ...................... 725/52 |
| 2007/0288961 | A1 | * | 12/2007 | Guldi et al. .................... 725/46 |
| 2008/0320393 | A1 | * | 12/2008 | Roberts et al. ................ 715/721 |
| 2009/0282369 | A1 | * | 11/2009 | Jones ........................... 715/848 |

OTHER PUBLICATIONS

Gopalakrishnan et al., Enhanced Clustering Analysis and Visualization Using Kohonen's Self-Organizing Feature Map Networks, Mar. 9, 2007.*
Gionis et al., Clustering Aggregation, 2005.*
Chung, et al., "Business Intelligence Explorer: a Knowledge Map Framework for Discovering Business Intelligence on the Web", pp. 10.
Gupta, et al., "Distance Based Clustering of Association Rules", pp. 1-6.
Kreuseler, et al., "Integration of Cluster Analysis and Visualization Techniques for Visual Data Analysis", pp. 1-9.

* cited by examiner (Continued)

*Primary Examiner* — Hoang-Vu A Nguyen-Ba

(57) ABSTRACT

Self-organizing media content is described. In embodiment(s), a self-organizing map can be applied to metadata that corresponds to television media content. A media content array of television media content choices can then be generated based on the mapped metadata where the media content array is organized to include n-dimensions that are each based on a different attribute of the metadata. The media content array can then be displayed on a user interface that facilitates dynamic traversal of the media content array for viewer selection of the television media content choices.

20 Claims, 6 Drawing Sheets

MANAGING MEDIA CONTENT WITH A SELF-ORGANIZING MAP

BACKGROUND

Viewers have an ever-increasing selection of television programming to choose from, and may want to locate programming choices that are of interest to them. In addition to scheduled television program broadcasts, television viewing options also include on-demand choices which enable a viewer to search for and request media content for viewing when convenient rather than at a scheduled broadcast time. Typically, a viewer can initiate a search for a list of television programming choices and on-demand viewing choices in a program guide (also commonly referred to as an electronic program guide or "EPG").

The television media content has associated metadata that describes and categorizes the media content. The metadata associated with a program can be obtained from any number of providers and compiled to include any form of information that describes and/or characterizes the program. For example, the metadata can include a program identifier, program title, plot description, actor information, date of production, broadcast channel, television network, artistic information, music compilations, and any other possible descriptive information about the program. Further, the metadata associated with a program can characterize a genre of the program that describes the content as being a movie, a comedy show, a sporting event, a news program, a sitcom, a talk show, an action/adventure program, or as any number of other category descriptions. A viewer can select a defined program category to find particular types of programs that may be of interest to a viewer.

Typical program descriptions, such as displayed in a program guide when a particular program or movie is selected, merely provide a short plot description, rating information, and/or a list of some cast members. These short, generic plot descriptions are typically obtained from a listing service, or a provider of the media content, and the rating information is provided by broadcast and cable television networks and/or by other associations. These simple program descriptions shown in a program guide, however, are displayed in a single dimension and rarely provide enough information for a viewer to decide whether a program or movie will be of interest to the viewer.

SUMMARY

This summary is provided to introduce simplified concepts of self-organizing media content. The simplified concepts are further described below in the Detailed Description. This summary is not intended to identify essential features of the claimed subject matter, nor is it intended for use in determining the scope of the claimed subject matter.

In embodiment(s) of self-organizing media content, a self-organizing map can be applied to metadata that corresponds to television media content. A media content array of television media content choices can then be generated based on the mapped metadata where the media content array is organized to include n-dimensions that are each based on a different attribute of the metadata. The media content array can then be displayed on a user interface that facilitates dynamic traversal of the media content array for viewer selection of the television media content choices.

In other embodiment(s), a television client device can include a program browser module that is implemented to apply the self-organizing map to the metadata and/or other programming associated information that corresponds to the television media content. The program browser module can then generate the media content array based on the mapped metadata and associated information. A user interface can display the media content array to include the television media content organized by at least a first dimension and a second dimension such that two dimensions combine to display likely viewer selections of the television media content. In an alternate embodiment, a content distributor includes the program browser module to map the metadata and generate the media content array that is communicated to television client device(s) for display.

In other embodiment(s), a media content array can be generated as an n-dimension array, such as a 3-dimensional array that organizes the television media content by an x-dimension, a y-dimension, and a z-dimension. A user interface can display the media content array to include the television media content organized by the at least three dimensions and such that the three dimensions combine to display likely viewer selections of the television media content.

BRIEF DESCRIPTION OF THE DRAWINGS

Embodiments of self-organizing media content are described with reference to the following drawings. The same numbers are used throughout the drawings to reference like features and components.

DETAILED DESCRIPTION

Embodiments of self-organizing media content provide that metadata associated with television media content can be mapped with a self-organizing map to organize the television media content for viewer selection. Unlike a conventional program guide that displays television programming choices in a single dimension, a media content array of television media content choices can be organized as an n-dimension array based on any number of various attributes of the metadata and/or other programming associated information. In addition, the choices of television media content displayed in the media content array are organized for viewer selection by combinations of metadata attributes and/or other associated information.

While features and concepts of the described systems and methods for self-organizing media content can be implemented in any number of different environments, computing systems, entertainment systems, and/or other various configurations, embodiments of self-organizing media content are described in the context of the following example systems and environments.

Figure 1:
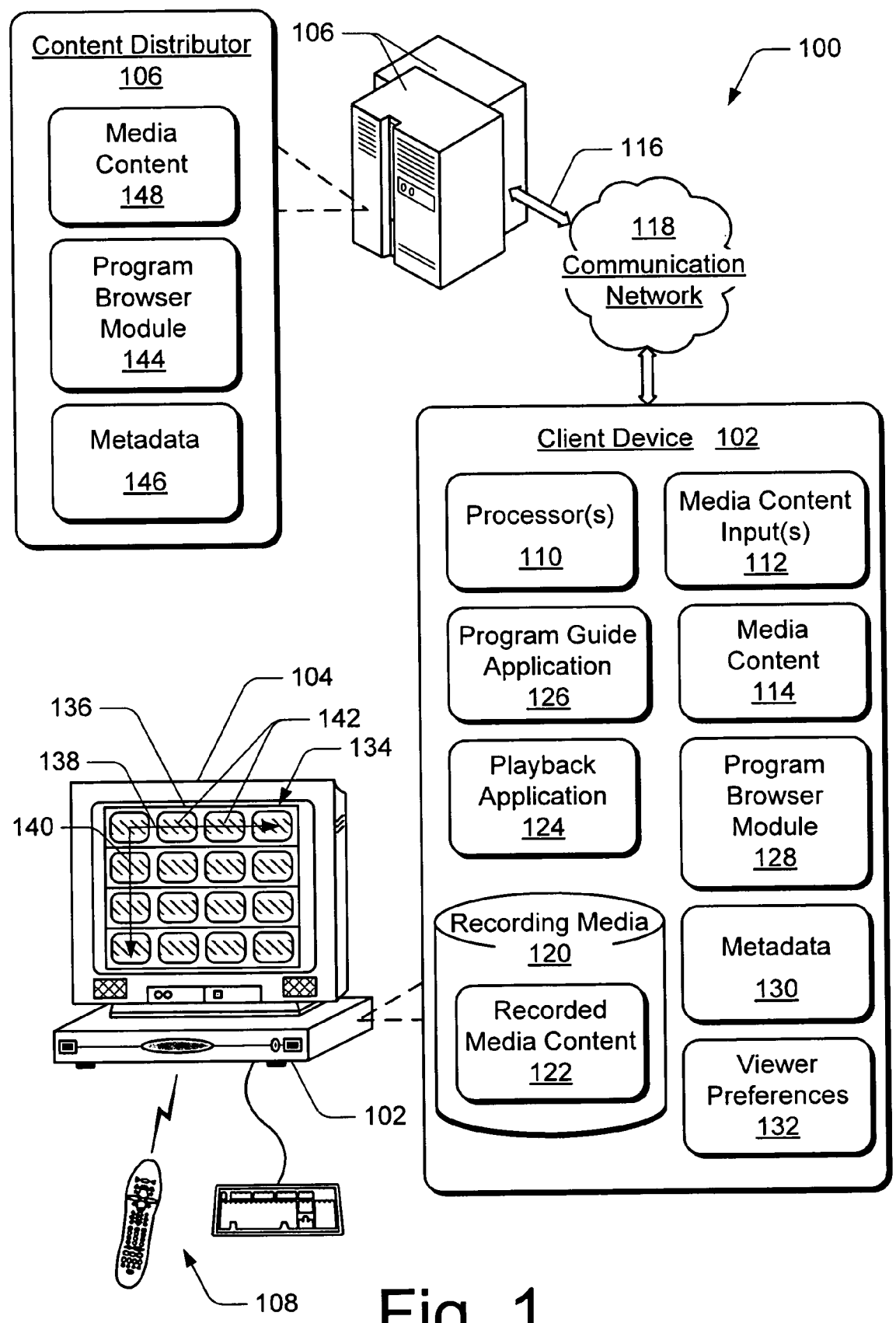
FIG. 1 illustrates an example system in which embodiments of self-organizing media content can be implemented.

FIG. 1 illustrates an example system 100 in which various embodiments of self-organizing media content can be implemented. In this example, system 100 includes a television client device 102, a display device 104, content distributor(s) 106, and input devices 108, such as a remote control device and/or a computer keyboard. The display device 104 can be implemented as any type of television, LCD, or similar television-based display system that renders audio, video, and/or image data. The client device 102 and display device 104 together are just one example of a television client system, examples of which are described with reference to the example system shown in FIG. 2, and with reference to the example entertainment and information system shown in FIG. 6.

Client device 102 can be implemented as any one or combination of a television set-top box, a digital video recorder (DVR) and playback system, an appliance device, a gaming console, and/or as any other type of television client device or computing-based device that may be implemented in a television entertainment and information system. Additionally, client device 102 can be implemented with any number and combination of differing components as further described with reference to the example client device shown in FIG. 5.

In this example system 100, client device 102 includes one or more processor(s) 110, media content inputs 112, and media content 114 (e.g., received media content or media content that is being received). The media content inputs 112 can include any type of Internet Protocol (IP) inputs over which streams of media content (e.g., IPTV media content) are received. Client device 102 can receive the media content 114 from any one or combination of content distributor(s) 106 via an IP-based network 116. The media content 114 can include television media content for a full-size television display as well as separate media streams of picture-in-picture media content received from a content distributor 106.

The IP-based network 116 can be implemented as part of a communication network 118 that facilitates media content distribution and data communication between the content distributor(s) 106 and any number of client devices, such as client device 102. The communication network 118 can be implemented as part of a media content distribution system using any type of network topology and/or communication protocol, and can be represented or otherwise implemented as a combination of two or more networks. The television client device 102 is configured for communication with the content distributor(s) 106 via the IP-based network 116 and/or the communication network 118.

Client device 102 also includes recording media 120 that maintains recorded media content 122. In an embodiment, the recorded media content 122 can include the media content 114 that is received from a content distributor 106 and recorded. For example, the media content 114 can be recorded when received as a viewer-scheduled recording, or when the recording media 120 is a pause buffer that records the media content 114 as it is being received and rendered for viewing.

The recording media 120 along with a playback application 124 can be implemented as a DVR (digital video recorder) system to record and maintain the recorded media content 122. The media content 114 and/or the recorded media content 122 can include television programs (or programming) which may be any form of programs, commercials, music, movies, and video on-demand media content. Other media content can include interactive games, network-based applications, music streamed from a computing device to the client device 102, as well as any other audio, video, and/or image content received from any type of media content source.

Client device 102 includes a program guide application 126 that processes program guide data from which a program guide can be rendered and displayed for viewing on display device 104. Additionally, client device 102 includes a program browser module 128 that implements embodiments of self-organizing media content. The playback application 124, program guide application 126, and the program browser module 128 can each be implemented as computer-executable instructions and executed by the processor(s) 110 to implement embodiments of self-organizing media content.

Although the program guide application 126 and the program browser module 128 are illustrated and described as independent applications, each can be implemented as several component applications or modules distributed to perform one or more functions of self-organizing media content. Further, the program guide application 126 and the program browser module 128 can be implemented together as a single application in client device 102 to implement embodiments of self-organizing media content.

In an embodiment, the program browser module 128 can be implemented to apply a self-organizing map to metadata 130 associated with the television media content 114. The self-organizing map was developed by Prof. Teuvo Kohonen, and is a data analysis technique to organize and represent data. Mapping the metadata 130 may also be referred to as "non-structured analysis". A self-organizing map can be applied to numerical representations of the metadata to map the metadata based on weighted qualifiers and/or numerical results. For example, the metadata 130 associated with a television program (e.g., television media content) can be represented numerically with a Naïve Bayesian or other algorithm that indexes or quantifies the metadata based on keywords, key phrases, descriptive words and phrases, and/or based on any other depictions of the program.

The numerical representation of the metadata 130 that is associated with a program can be based on any number of attributes of the metadata, such as the program title, description, name of actors, and any other descriptive information about the program. Other information associated with the program can also be included with the metadata information to further quantify and represent the program. For example, review data from critics, approximations of viewership, viewer preferences 132, and any other associated information can be included with the metadata information and compiled to map the metadata with the self-organizing map.

A media content review can be obtained or provided from any number of different sources, such as from movie reviewers and critics, from Usenet groups that post media content review notes, from "blogs" (i.e., Weblogs) posted by individuals, and/or from any other sources. Television programs and movies are typically rated by broadcast and cable television networks according to the networks' standards and/or by the MPAA (Motion Picture Association of America). Other program and movie ratings, such as the various parental control ratings, are assigned by a board, committee, association, or other regulatory body, such as the TV Parental Guidelines ratings system. A popularity attribute of the metadata can include ratings from ratings providers, such as NIELSEN and/or ARBITRON data for a previous week, month, or other duration to approximate how many viewers watch a particular program.

A self-organizing map can be generated as an array from the metadata 130 associated with any number of television programs, such that each television program is a node of the array. Those programs that are determined to be numerically similar based on any of the attributes, or having a relevance based on the metadata attributes and/or other associated information, can be grouped near each other in the mapped array. In an embodiment, the program browser module 128 can be implemented to then generate a media content array 134 based on the mapped metadata. The media content array 134 is a media content browsing space which can be displayed as a user interface 136 on display device 104 for viewer selection of the television media content. A viewer can dynamically traverse and navigate the media content array 134 utilizing an input device 108, such as the remote control device.

Unlike a conventional program guide that displays television programming choices in a single dimension, television media content choices can be organized in the media content array 134 by a first dimension 138 (e.g., an x-dimension) based on a first attribute of the metadata 130, and by at least a second dimension 140 (e.g., a y-dimension) based on a second attribute of the metadata 130. The first dimension 138 and the second dimension 140 of the media content array 134 are combined to create combinations of metadata attributes to display likely viewer selections of the television media content. For example, the television media content can be organized in the media content array 134 by any combination of critics' ratings, viewership, program description, popularity, actors' names, and/or any other attribute or associated metadata information.

In various embodiments, the television media content can also be organized in the media content array 134 by a combination of a static dimension, such as the program descriptions, and a dynamic dimension, such as current viewership. A first attribute of the metadata 130 can be a dynamic attribute such that the first dimension 138 of the media content array 134 is based on a numerical representation of the dynamic attribute. Additionally, a second attribute of the metadata 130 can be a static attribute such that the second dimension 140 of the media content array 134 is based on a numerical representation of the static attribute.

In an embodiment, each of the television media content choices in the media content array 134 can be displayed as a picture-in-picture 142 for viewer selection. Alternatively, or in addition, each of the television media content choices displayed in the media content array 134 can be displayed as any combination of video, images, and/or text.

The media content array 134 can be initiated for display on the display device 104 in response to any of a power-on of the television client device 102, a viewer-initiated search request, and/or a viewer request to display a program guide, such as with the remote control device 108. In an embodiment, the media content browsing space is displayed as the media content array 134 when the client device 102 is turned on such that likely programming choices are displayed right away for viewer selection. For example, a viewer may return home on the evening of a big awards show for the movie industry. Although the viewer may not usually watch such programs (i.e., not a viewer preference 132), the awards show can be included in the media content array 134 as a displayed television programming choice due to its popularity and current viewership for the one evening.

In an alternate embodiment of the example system 100, a content distributor 106 can include a program browser module 144 rather than, or in addition to, the program browser module 128 implemented in client device 102. The program browser module 144 can be implemented to apply a self-organizing map to metadata 146 associated with television media content 148. The content distributor 106 can then communicate the media content 148, the mapped metadata, and/ or a generated media content array to any number of client devices, such as client device 102.

Figure 2:
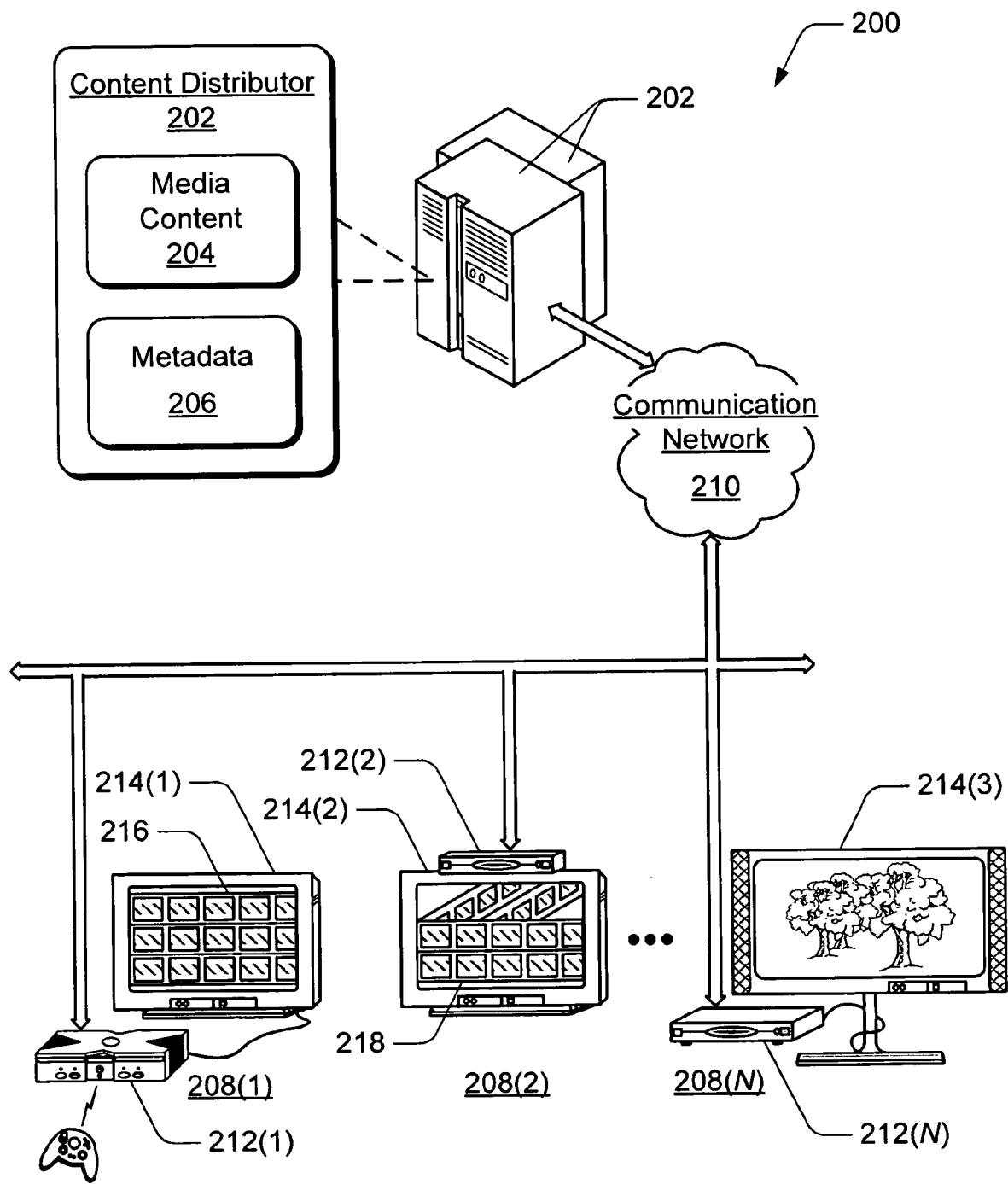
FIG. 2 illustrates another example system in which embodiments of self-organizing media content can be implemented.

FIG. 2 illustrates another example system 200 in which various embodiments of self-organizing media content can be implemented. The system 200 includes content distributor(s) 202 that communicate media content 204 and metadata 206 to any number "N" of various television client systems 208(1-N) via a communication network 210. An example of a communication network is described with reference to communication network 118, and examples of client devices in television client systems are described with reference to television client device 102 shown in FIG. 1. The communication network 210 can be implemented to include an IP-based network that facilitates media content distribution and data communication between the content distributor(s) 202 and any number of television client devices.

Each of the client systems 208(1-N) include a respective television client device 212(1-N) and a respective display device 214(1-N), such as any type of television, monitor, LCD, or similar television-based display system that renders audio, video, and/or image data. Any of the client devices 212(1-N) can be implemented as any one or combination of a television client device, a gaming system, or as any other computing-based device, such as a desktop computer, a portable computer, a television set-top box, a digital video recorder (DVR), an appliance device, a gaming console, and/or as any other type of computing-based client device. Any of the television client devices 212(1-N) may also be associated with a user (i.e., a person) and/or an entity that operates a client device such that a television client device describes logical clients that include users, software, and/or devices.

Any of the television client devices 212(1-N) of the respective client systems 208(1-N) can be implemented with one or more processors, a communication module, memory components, a media content rendering system, and a program browser module to implement embodiments of self-organizing media content. Additionally, each of the television client devices 212(1-N) can be configured for communication with any number of different content distributors 202 to receive any type of media content 204 and the metadata 206 via the communication network 210. Further, any of the television client devices 212(1-N) can be implemented with any number and combination of differing components as further described with reference to the example client device shown in FIG. 5.

In this example, display device 214(1) of respective client system 208(1) displays a 2-dimensional media content array 216 of television programming choices for viewer selection. Additionally, display device 214(2) of respective client system 208(2) displays a 3-dimensional media content array 218 of television programming choices for viewer selection. In this example, television media content can be organized in the media content array by first, second, and third dimensions that are each based on attributes or other information associated with the metadata 206. The television programming choices displayed in the media content array are displayed for viewer selection from any of the first, second, or third dimensions. Further examples of a 2-dimensional media content array and a 3-dimensional media content array are shown in FIG. 3.

Figure 3:
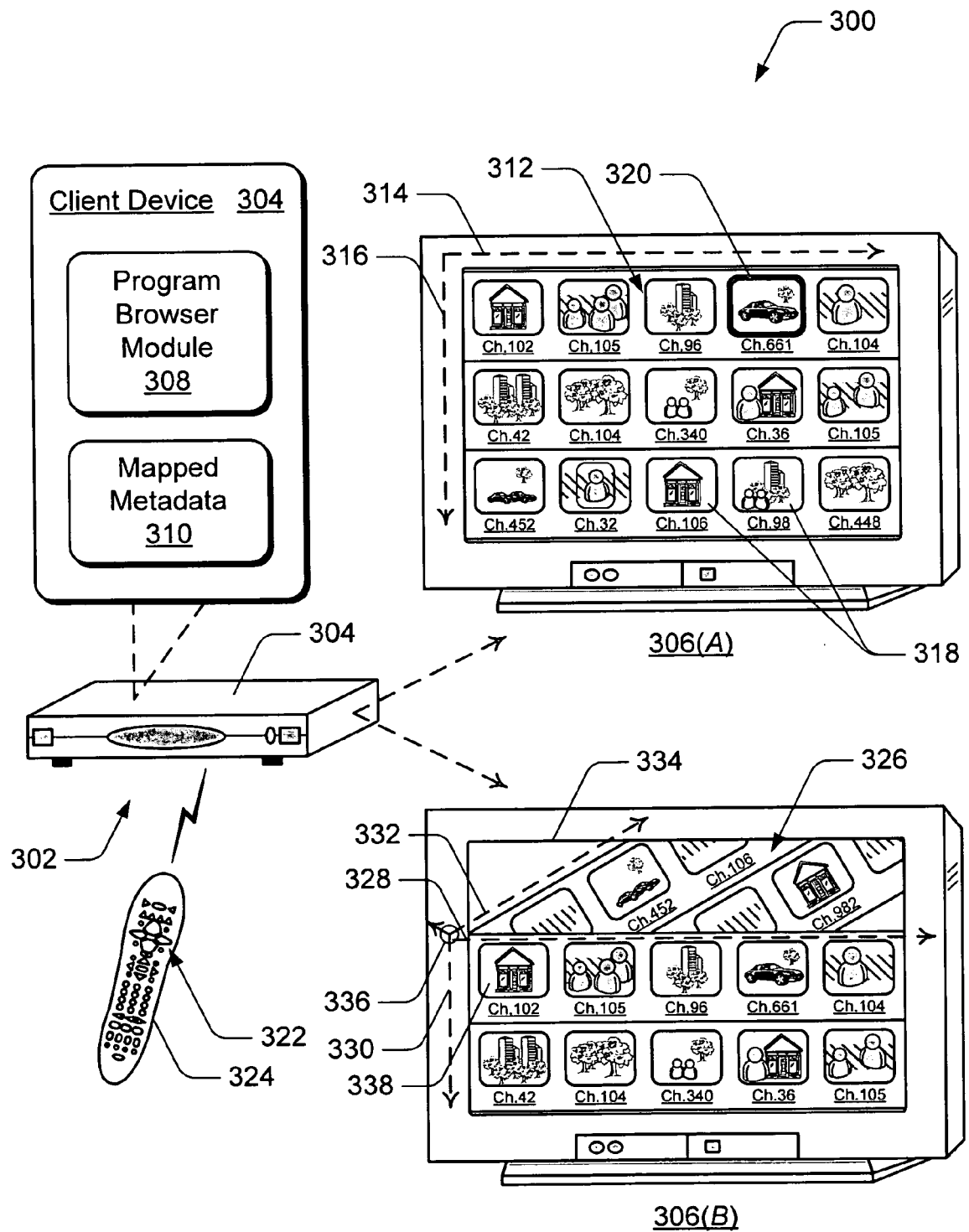
FIG. 3 illustrates an example television client system in which embodiments of self-organizing media content can be implemented.

FIG. 3 illustrates an example 300 of a television client system 302 that includes a television client device 304 and different representations of a display device 306(A-B) to illustrate various n-dimensional media content arrays in embodiments of self-organizing media content. The client device 304 includes a program browser module 308 that applies a self-organizing map to generate mapped metadata 310 that is associated with television media content. An example of a program browser module is described with reference to program browser module 128 shown in FIG. 1 to implement embodiments of self-organizing media content.

An example of a 2-dimensional media content array 312 is shown on display device 306(A). In an embodiment, the media content array 312 can be displayed on a user interface when shown on display device 306(A). In this example, the media content array 312 is organized by a first dimension 314 (e.g., an x-dimension) based on a first attribute of the metadata 310, and by a second dimension 316 (e.g., a y-dimension) based on a second attribute of the metadata 310. The first dimension 314 and the second dimension 316 of the media content array 312 are combined to create combinations of metadata attributes to display likely viewer selections of the television media content. Here, the television media content choices are each displayed as a picture-in-picture 318 along with a channel designation for viewer selection.

A media content browsing space displayed as a user interface, such as media content array 312, can include a selectable control 320 shown implemented as an on-screen focus that can be positioned to select a picture-in-picture 318 of a television program. When selected by a viewer, the television program can then be displayed as full-size television media content on display device 306(A). The viewer can move the selectable control 320 within the media content array 312 and select the various television media content by manipulating input selections 322 on a remote control input device 324.

An example of a 3-dimensional media content array 326 is shown displayed on display device 306(B). In this example, the media content array 326 is organized by a first dimension 328 (e.g., an x-dimension) based on a first attribute of the metadata 310, by a second dimension 330 (e.g., a y-dimension) based on a second attribute of the metadata 310, and by a third dimension 332 (e.g., a z-dimension) based on a third attribute of the metadata 310. In an embodiment, the media content array 326 can be displayed on a user interface 334 when shown on display device 306(A). Additionally, although media content array 326 is shown having only three dimensions, a media content array can be implemented as an n-dimensional array that includes any number of dimensions 336 that are each based on a different attribute of the metadata 310.

The first dimension 328, the second dimension 330, and the third dimension 332 of the media content array 326 are combined to create combinations of metadata attributes to display likely viewer selections of the television media content. For example, the media content array 326 can represent a combination of program popularity (x-dimension), television ratings (y-dimension), and program descriptions (z-dimension). In an embodiment, the television programming choice shown in the top, left 338 of the media content array 326 can be the most likely viewer choice, and a viewer can navigate in the direction of any dimension to select other similar television programming choices. Here, a television program that is popular and has a high rating will be displayed in the media content array 326 in the upper, left corner 338. Additionally, the programs having a similar program description are displayed along the z-dimension 332.

Generally, any of the functions, methods, and modules described herein can be implemented using hardware, software, firmware (e.g., fixed logic circuitry), manual processing, or any combination thereof. A software implementation of a function, method, or module represents program code that performs specified tasks when executed on a computing-based processor. Example method 400 described with reference to FIG. 4 may be described in the general context of computer-executable instructions. Generally, computer-executable instructions can include applications, routines, programs, objects, components, data structures, procedures, modules, functions, and the like that perform particular functions or implement particular abstract data types.

The method(s) may also be practiced in a distributed computing environment where functions are performed by remote processing devices that are linked through a communications network. In a distributed computing environment, computer-executable instructions may be located in both local and remote computer storage media, including memory storage devices. Further, the features described herein are platform-independent such that the techniques may be implemented on a variety of computing platforms having a variety of processors.

Figure 4:
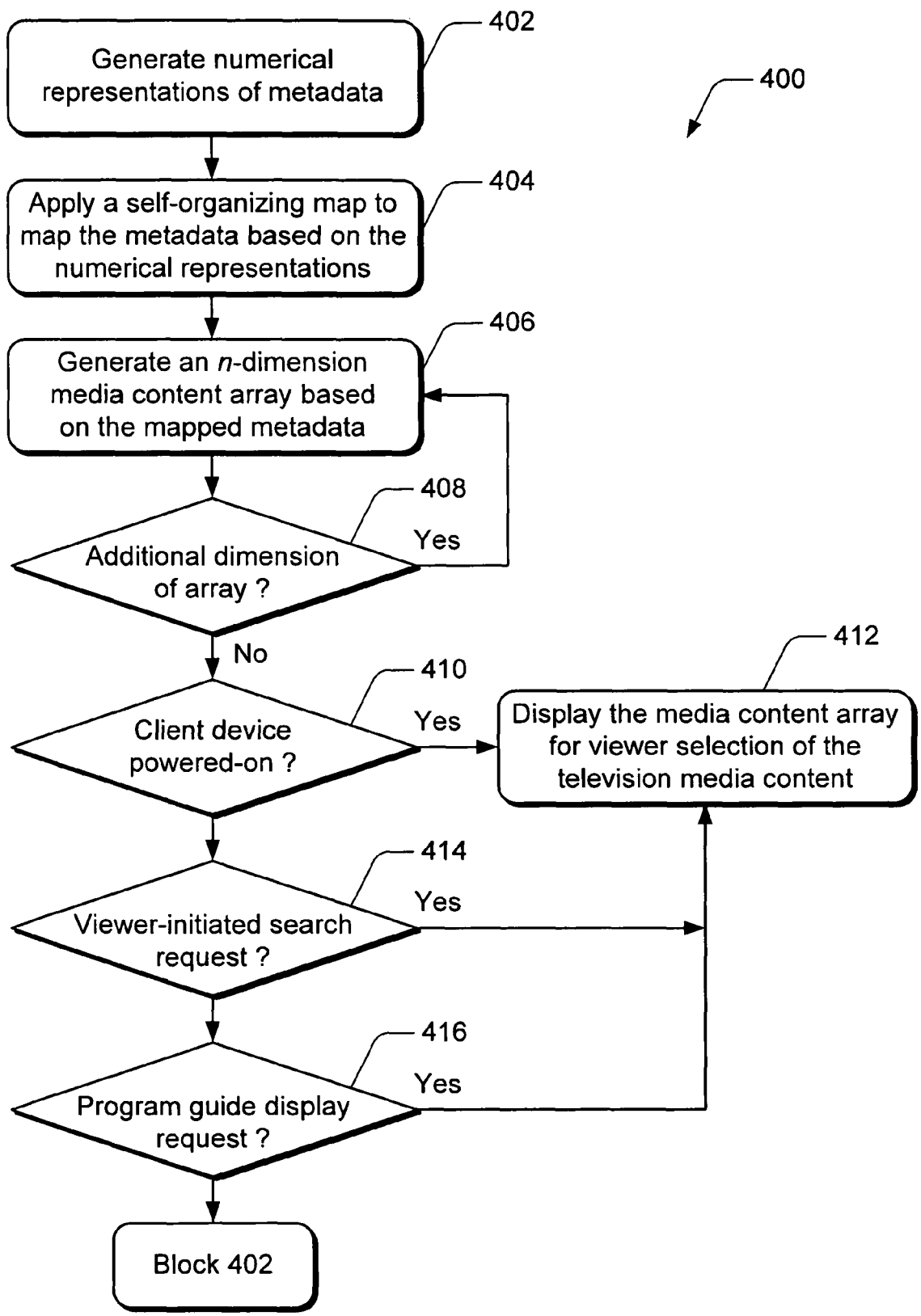
FIG. 4 illustrates example method(s) for self-organizing media content in accordance with one or more embodiments.

FIG. 4 illustrates example method(s) 400 of self-organizing media content. The order in which the method is described is not intended to be construed as a limitation, and any number of the described method blocks can be combined in any order to implement the method, or an alternate method.

At block 402, numerical representations of metadata associated with television media content are generated. For example, the program browser module 128 of television client device 102 (FIG. 1) evaluates the metadata 130 that is associated with media content 114, such as television programs, to generate numerical representations of the metadata for each television program. Alternatively, the program browser module 144 of a content distributor 106 evaluates the metadata 146 that is associated with media content 148 to generate numerical representations of the metadata for various television media content. A numerical representation of metadata or other information associated with television media content can be generated with a Naïve Bayesian or other algorithm that indexes or quantifies the metadata based on keywords, key phrases, descriptive words and phrases, and/or based on any other depictions of the program.

At block 404, a self-organizing map is applied to map the metadata based on the generated numerical representations, and at block 406, an n-dimension media content array is generated based on the mapped metadata. For example, the program browser module 128 of television client device 102 can apply a self-organizing map to the metadata 130 (e.g., numerical representations thereof) to generate media content array 134 shown as a media content browsing space on user interface 136 of display device 104.

In various embodiments, a media content array can be generated and organized by any number of dimensions that are based on attributes of the metadata and/or based on other metadata associated information. The dimensions of a media content array create combinations of metadata attributes to display likely viewer selections of television media content. For example, media content array 312 (FIG. 3) is a 2-dimensional array that includes both an x-dimension 314 based on a first attribute of the metadata 310 and a y-dimension 316 based on a second attribute of the metadata 310.

At block 408, a determination is made as to whether an additional dimension of the media content array is to be generated. If an additional dimension of the media content array is to be generated (i.e., "Yes" from block 408), then the method continues at block 406 to generate the media content array to include the additional dimension. For example, media content array 326 (FIG. 3) is a 3-dimensional array that includes an x-dimension 328 based on a first attribute of the metadata 310, a y-dimension 330 based on a second attribute of the metadata 310, and a z-dimension 332 based on a third attribute of the metadata 310. The media content array 326 is displayed as a 3-dimensional array for viewer selection of the television media content from any of the first, second, and/or third dimensions.

If an additional dimension of the media content array is not to be generated (i.e., "No" from block 408), then at block 410, a determination is made as to whether a television client device is powered-on. If the television client device is powered-on (i.e., "Yes" from block 410), then at block 412, the media content array is displayed for viewer selection of the television media content programming choices. For example, if a viewer turns on television client device 102 (FIG. 1), then the media content array 134 is initiated for display on display device 104 such that likely viewer programming choices are displayed for viewer selection.

In addition to the client device being powered-on at block 410, a determination can be made at block 414 as to whether a viewer-initiated search request is received. If a viewer-initiated search request is received (i.e., "Yes" from block 414), then at block 412, the media content array is displayed for viewer selection of the television media content programming choices. For example, if a viewer initiates a media content search request at television client device 102 (FIG. 1), then the media content array 134 is initiated for display on display device 104 such that likely viewer programming choices are displayed for viewer selection.

In addition, a determination can be made at block 416 as to whether a program guide display request is received. If a program guide display request is received (i.e., "Yes" from block 416), then at block 412, the media content array is displayed for viewer selection of the television media content programming choices. For example, if a viewer initiates a request for a program guide display at television client device 102 (FIG. 1), then the media content array 134 is initiated for display on display device 104 such that likely viewer programming choices are displayed for viewer selection.

Figure 5:
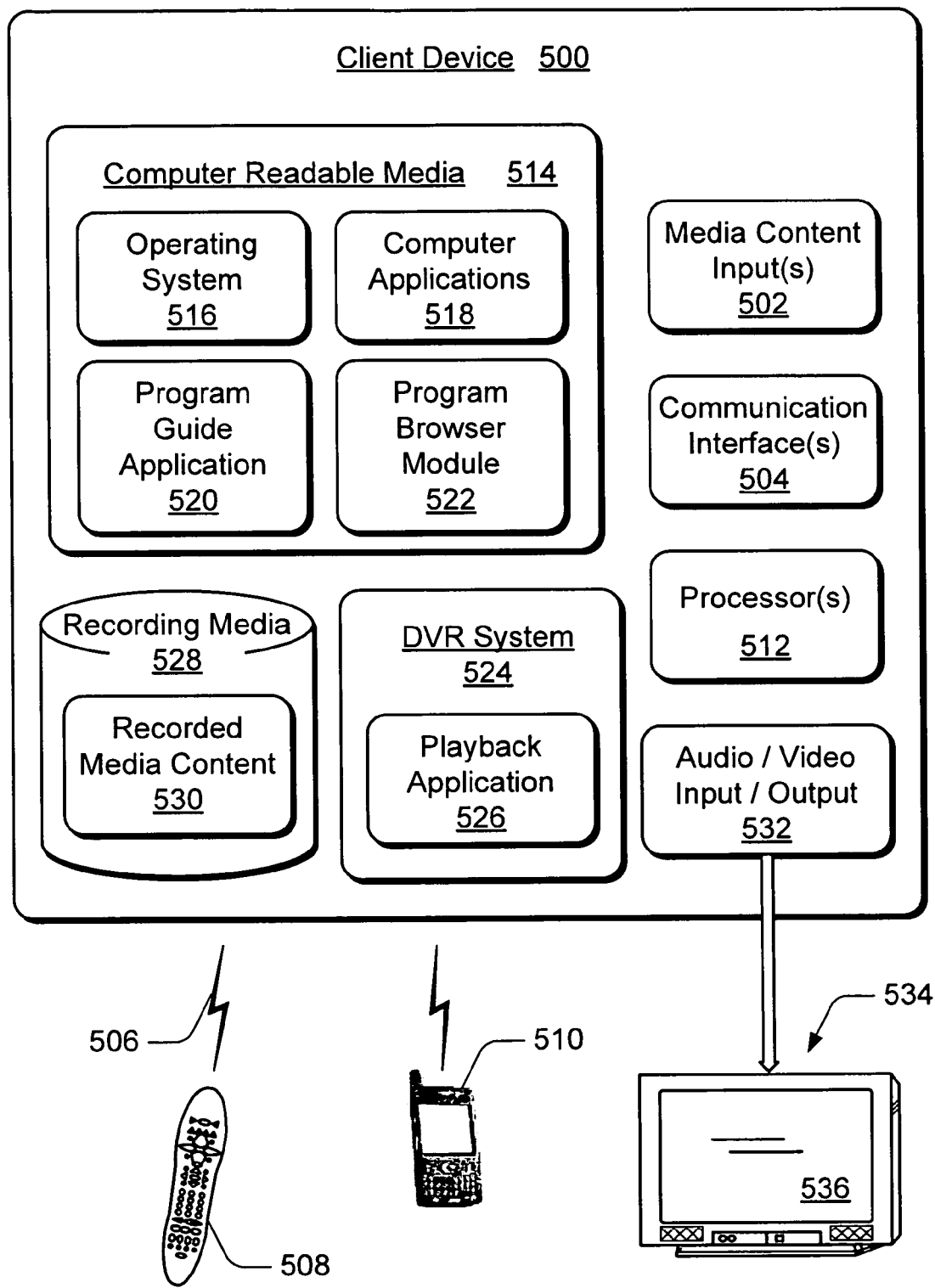
FIG. 5 illustrates various components of an example client device which can implement embodiments of self-organizing media content.

FIG. 5 illustrates various components of an example client device 500 that can be implemented as any form of a computing, electronic, or television client device to implement embodiments of self-organizing media content. For example, client device 500 can be implemented as client device 102 shown in FIG. 1, and/or as any of the client devices 212(1-N) of the client systems 208(1-N) shown in FIG. 2. In various embodiments, client device 500 can be implemented as any one or combination of a television client device, a gaming system, or as any other computing-based device, such as a desktop computer, a portable computer, a television set-top box, a digital video recorder (DVR), an appliance device, a gaming console, and/or as any other type of computing-based client device.

Client device 500 includes one or more media content inputs 502 that may include Internet Protocol (IP) inputs over which streams of media content are received via an IP-based network. Client device 500 further includes communication interface(s) 504 that can be implemented as any one or more of a serial and/or parallel interface, a wireless interface, any type of network interface, a modem, and as any other type of communication interface. A wireless interface enables client device 500 to receive control input commands 506 and other information from an input device, such as from remote control device 508, a portable computing-based device (such as a cellular phone) 510, or from another infrared (IR), 802.11, Bluetooth, or similar RF input device.

A network interface provides a connection between client device 500 and a communication network by which other electronic and computing devices can communicate data with device 500. Similarly, a serial and/or parallel interface provides for data communication directly between client device 500 and the other electronic or computing devices. A modem facilitates client device 500 communication with other electronic and computing devices via a conventional telephone line, a DSL connection, cable, and/or other type of connection.

Client device 500 also includes one or more processors 512 (e.g., any of microprocessors, controllers, and the like) which process various computer-executable instructions to control the operation of device 500, to communicate with other electronic and computing devices, and to implement embodiments of self-organizing media content. Client device 500 can be implemented with computer-readable media 514, such as one or more memory components, examples of which include random access memory (RAM), non-volatile memory (e.g., any one or more of a read-only memory (ROM), flash memory, EPROM, EEPROM, etc.), and a disk storage device. A disk storage device can include any type of magnetic or optical storage device, such as a hard disk drive, a recordable and/or rewriteable compact disc (CD), a DVD, a DVD+RW, and the like.

Computer-readable media 514 provides data storage mechanisms to store various information and/or data such as software applications and any other types of information and data related to operational aspects of client device 500. For example, an operating system 516 and/or other computer applications 518 can be maintained as software applications with the computer-readable media 514 and executed on processor(s) 512 to implement embodiments of self-organizing media content.

Client device 500 can also include a program guide application 520 that is implemented to process program guide data and generate program guides for display. A program guide enables a viewer to navigate through an onscreen display and locate various media content such as broadcast programs, recorded programs, video on-demand programs and movies, interactive game selections, network-based applications, and other media content of interest to the viewer. Client device 500 can also include a program browser module 522 (shown as a software module in this example) to implement various embodiments of self-organizing media content as described herein. Examples of program browser module 522 are described with reference to program browser module 128 in client device 102 and program browser module 144 in content distributor 106 as shown in FIG. 1, and with reference to program browser module 308 shown in FIG. 3.

Client device 500 can also include a DVR system 524 with playback application 526, and recording media 528 to maintain recorded media content 530 that client device 500 receives and/or records. Further, client device 500 may access or receive additional recorded media content that is maintained with a remote data store (not shown). Client device 500 may also receive media content from a video-on-demand server, or media content that is maintained at a broadcast center or content distributor that distributes the media content to subscriber sites and client devices. The playback application 526 is a video control application that can be implemented to control the playback of media content, the recorded media content 530, and/or other video on-demand media content, music, and any other audio, video, and/or image media content which can be rendered and/or displayed for viewing.

Client device 500 also includes an audio and/or video output 532 that provides audio and/or video data to an audio rendering and/or display system 534. The audio rendering and/or display system 534 can include any devices that process, display, and/or otherwise render audio, video, and image data. Video signals and audio signals can be communicated from client device 500 to a display device 536 via an RF (radio frequency) link, S-video link, composite video link, component video link, DVI (digital video interface), analog audio connection, or other similar communication link. Alternatively, the audio rendering and/or display system 534 can be implemented as integrated components of the example client device 500. Client device 500 along with the audio rendering and/or display system 534 is an example of a viewing system that can be implemented in a household viewing area for viewing television programs and/or receiving other television media content.

Figure 6:
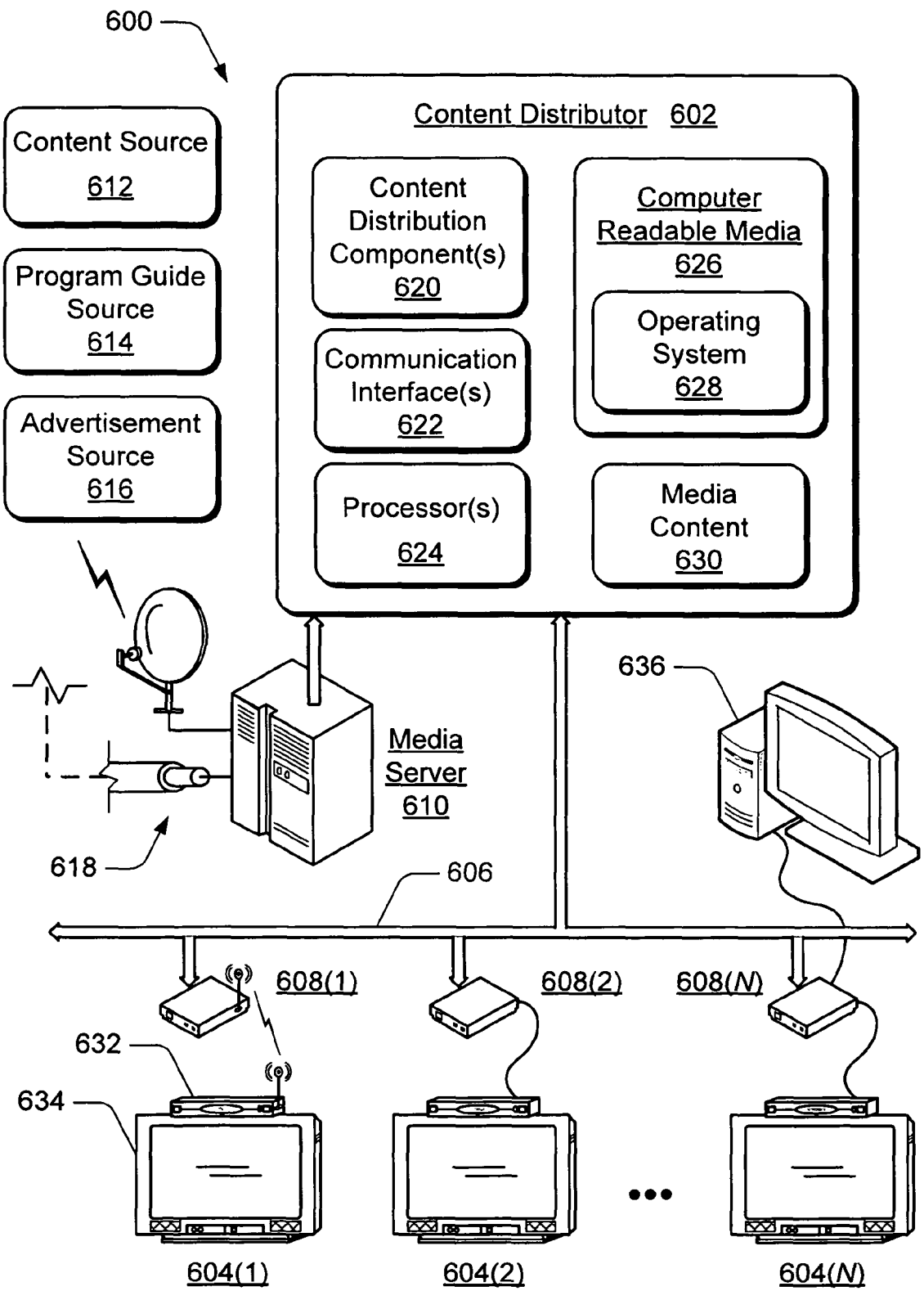
FIG. 6 illustrates various devices and components in an example entertainment and information system in which embodiments of self-organizing media content can be implemented.

FIG. 6 illustrates an example entertainment and information system 600 in which embodiments of self-organizing media content can be implemented. System 600 facilitates the distribution of media content, metadata, program guide data, and advertising content to multiple viewers and to multiple viewing systems. System 600 includes a content distributor 602 and any number "N" of client systems 604(1-N) each configured for communication via a communication network 606. Each client system 604(1-N) is an example of the client systems 208(1-N) described with reference to FIG. 2. Each of the client systems 604(1-N) can receive data streams of media content, associated metadata, program content, program guide data, advertising content, and the like from content server(s) of the content distributor 602 via the communication network 606.

The communication network 606 can be implemented as any one or combination of a wide area network (e.g., the Internet), a local area network (LAN), an intranet, an IP-based network, a broadcast network, a wireless network, a Digital Subscriber Line (DSL) network infrastructure, a point-to-point coupling infrastructure, or as any other media content distribution network. Additionally, communication network 606 can be implemented using any type of network topology and any network communication protocol, and can be represented or otherwise implemented as a combination of two or more networks. A digital network can include various hardwired and/or wireless links 608(1-N), routers, gateways, and so on to facilitate communication between content distributor 602 and the client systems 604(1-N).

System 600 includes a media server 610 that receives media content from a content source 612, program guide data from a program guide source 614, and advertising content from an advertisement source 616. In an embodiment, the media server 610 represents an acquisition server that receives the audio and video media content from content source 612, an EPG server that receives the program guide data from program guide source 614, and/or an advertising management server that receives the advertising content from the advertisement source 616.

The content source 612, the program guide source 614, and the advertisement source 616 control distribution of the media content, the program guide data, and the advertising content to the media server 610 and/or to other servers. The media content, program guide data, and advertising content can be distributed via various transmission media 618, such as satellite transmission, radio frequency transmission, cable transmission, and/or via any number of other wired or wireless transmission media. In this example, media server 610 is shown as an independent component of system 600 that communicates the program content, program guide data, and advertising content to content distributor 602. In an alternate implementation, media server 610 can be implemented as a component of content distributor 602.

Content distributor 602 is representative of a headend service in a content distribution system, for example, that provides the media content, associated metadata, program guide data, and advertising content to multiple subscribers (e.g., the client systems 604(1-N)). The content distributor 602 can be implemented as a satellite operator, a network television operator, a cable operator, and the like to control distribution of media content, program and advertising content, such as movies, television programs, commercials, music, and other audio, video, and/or image content to the client systems 604 (1-N).

Content distributor 602 includes various content distribution components 620 to facilitate media content processing and distribution, such as a subscriber manager, a device monitor, and one or more content servers. The subscriber manager manages subscriber data, and the device monitor monitors the client systems 604(1-N) (e.g., and the subscribers), and maintains monitored client state information.

Although the various managers, servers, and monitors of content distributor 602 (to include the media server 610 in one embodiment) are described as distributed, independent components of content distributor 602, any one or more of the managers, servers, and monitors can be implemented together as a multi-functional component of content distributor 602. Additionally, any one or more of the managers, servers, and monitors described with reference to system 600 can implement features and embodiments of self-organizing media content.

The content distributor 602 includes communication interface(s) 622 that can be implemented as any type of interface to communicate and receive data from client devices of the television system. The content distributor 602 also includes one or more processors 624 (e.g., any of microprocessors, controllers, and the like) which process various computer-executable instructions to control the operation of content distributor 602. The content distributor 602 can be implemented with computer-readable media 626 which provides data storage to maintain software applications such as an operating system 628, a program browser module, metadata, and media content 630 for distribution to the client systems 604(1-N).

The client systems 604(1-N) can each be implemented to include a client device 632 and a display device 634 (e.g., a television, LCD, and the like). A client device 632 of a respective client system 604 can be implemented in any number of embodiments, such as a set-top box, a digital video recorder (DVR) and playback system, an appliance device, a gaming system, and as any other type of client device that may be implemented in an entertainment and information system. In an alternate embodiment, client system 604(N) is implemented with a computing device 636 as well as a client device. The computing device 636 is an example of a connected data store that can record and maintain media content for a client device. Additionally, any client device 632 of a respective client system 604 can implement features and embodiments of self-organizing media content as described herein.

Although embodiments of self-organizing media content have been described in language specific to features and/or methods, it is to be understood that the subject of the appended claims is not necessarily limited to the specific features or methods described. Rather, the specific features and methods are disclosed as example implementations of self-organizing media content.

The invention claimed is:
1. A computer-implemented method, comprising:
applying a self-organizing map to metadata that corresponds to television media content to generate numerical correlations between the television media content;
generating a media content array of the television media content based on the mapped metadata and the numerical correlations, the media content array being organized to include n-dimensions that are each based on a different attribute of the metadata, and the media content array including nodes that each correlate to one of the television media content;
determining, without user interaction, that an additional dimension is to be created for the media content array;
responsive to the determining, creating the additional dimension based on an additional attribute of the metadata; and displaying, on a display device the media content array on a user interface that facilitates dynamic traversal of the media content array for viewer selection of the television media content.

2. A computer-implemented method as recited in claim 1, wherein the self-organizing map is applied to a numerical analysis of the metadata that corresponds to the television media content to generate the media content array.

3. A computer-implemented method as recited in claim 1, wherein each of the television media content is displayed in the media content array as a picture-in-picture.

4. A computer-implemented method as recited in claim 1, wherein the media content array is initiated for display in response to at least one of power-on of a television client device, a viewer-initiated search request, or a request to display a program guide.

5. A computer-implemented method as recited in claim 1, wherein the n-dimensions of the media content array include at least a first dimension based on a first attribute of the metadata and a second dimension based on a second attribute of the metadata, the first dimension and the second dimension being combined to display likely viewer selections of the television media content.

6. A computer-implemented method as recited in claim 5, wherein the n-dimensions further include at least a third dimension based on a third attribute of the metadata, the media content array being displayed as a 3-dimensional array for viewer selection of the television media content from any of the first, second, or third dimensions.

7. A computer-implemented method as recited in claim 5, wherein the first attribute of the metadata is a dynamic attribute and the first dimension is based on a numerical representation of the dynamic attribute, and wherein the second attribute of the metadata is a static attribute and the second dimension is based on a numerical representation of the static attribute.

8. A computer-implemented method as recited in claim 5, wherein the first attribute of the metadata is viewership of the television media content and the first dimension is based on a numerical representation of the viewership, and wherein the second attribute of the metadata is program ratings of the television media content and the second dimension is based on a numerical representation of the program ratings.

9. A computer-implemented method as recited in claim 8, wherein the n-dimensions further include at least a third dimension based on a third attribute of the metadata, the third attribute of the metadata being descriptions of the television media content and the third dimension is based on a numerical representation of the descriptions.

10. A television client device, comprising:
at least a memory and a processor configured to generate an n-dimension array that displays television media content for viewer selection, the n-dimension array generated responsive to a self-organizing map applied to metadata that corresponds to the television media content to generate numerical correlations between the television media content, the n-dimension array including:
nodes that each correlate to one of the television media content, wherein proximate nodes each correlate to numerically similar television media content;
a first dimension of the n-dimension array based on a first attribute of the metadata that corresponds to the television media content; and
at least a second dimension of the n-dimension array based on a second attribute of the metadata that corresponds to the television media content.

11. A television client device as recited in claim 10, wherein the n-dimension array includes a third dimension based on a third attribute of the metadata that corresponds to the television media content, the n-dimension array being displayed as a 3-dimensional array for viewer selection of the television media content from any of the first, second, or third dimensions.

12. A television client device as recited in claim 10, wherein the first dimension and the second dimension of the n-dimension array are combined to display likely viewer selections of the television media content.

13. A television client device as recited in claim 10, wherein each of the television media content is displayed as a picture-in-picture.

14. A television client device as recited in claim 10, wherein the first attribute of the metadata is a dynamic attribute and the first dimension of the n-dimension array is based on a numerical representation of the dynamic attribute, and wherein the second attribute of the metadata is a static attribute and the second dimension of the n-dimension array is based on a numerical representation of the static attribute.

15. A television system, comprising:
at least a processor and a memory having instructions executable by the processor to implement:
a program browser module configured to apply a self-organizing map to metadata that corresponds to television media content, and further configured to generate a media content array based on the mapped metadata and numerical correlations between the television media content, the media content array including nodes that each correlate to one of the television media content, wherein proximate nodes each correlate to numerically similar television media content; and
a user interface configured to display the media content array for viewer selection of the television media content, the television media content organized by n-dimensions in the media content array where each dimension is based on a different attribute of the metadata.

16. A television system as recited in claim 15, further comprising a television client device that includes the program browser module to generate the media content array for display on the user interface.

17. A television system as recited in claim 15, further comprising a content distributor that includes the program browser module, and further includes a media content distribution system configured to distribute the television media content and the media content array to one or more television client devices.

18. A television system as recited in claim 15, wherein the n-dimensions of the media content array include at least a first dimension based on a first attribute of the metadata and a second dimension based on a second attribute of the metadata, and wherein the first dimension and the second dimension of the media content array are combined to display likely viewer selections of the television media content.

19. A television system as recited in claim 18, wherein the television media content is organized in the media content array by at least a third dimension based on a third attribute of the metadata, the media content array being displayed as a 3-dimensional array for viewer selection of the television media content from any of the first, second, or third dimensions.

20. A television system as recited in claim 18, wherein the first attribute of the metadata is a dynamic attribute and the first dimension of the media content array is based on a numerical representation of the dynamic attribute, and wherein the second attribute of the metadata is a static attribute and the second dimension of the media content array is based on a numerical representation of the static attribute.

* * * * *